US010643023B2

United States Patent
Su et al.

(10) Patent No.: US 10,643,023 B2
(45) Date of Patent: May 5, 2020

(54) PROGRAMMATIC NATIVE RENDERING OF STRUCTURED CONTENT

(71) Applicant: Oath Inc., New York, NY (US)

(72) Inventors: Timothy Su, Mountain View, CA (US); Shuai Li, Sunnyvale, CA (US); Jorge Pintado, Sunnyvale, CA (US); Pablo Pons Bordes, Sunnyvale, CA (US)

(73) Assignee: Oath, Inc., New York, NY (US)

( * ) Notice: Subject to any disclaimer, the term of this patent is extended or adjusted under 35 U.S.C. 154(b) by 671 days.

(21) Appl. No.: 14/866,388

(22) Filed: Sep. 25, 2015

(65) Prior Publication Data

US 2017/0091159 A1 Mar. 30, 2017

(51) Int. Cl.
*G06F 17/22* (2006.01)
*G06F 17/21* (2006.01)
*G06F 17/27* (2006.01)
*G06F 8/38* (2018.01)
*G06F 40/14* (2020.01)
*G06F 40/106* (2020.01)
*G06F 40/154* (2020.01)
*G06F 40/197* (2020.01)

(52) U.S. Cl.
CPC .............. *G06F 40/14* (2020.01); *G06F 8/38* (2013.01); *G06F 17/2705* (2013.01); *G06F 40/106* (2020.01); *G06F 40/154* (2020.01); *G06F 40/197* (2020.01)

(58) Field of Classification Search
CPC ............. G06F 17/2247; G06F 17/2705; G06F 17/2288; G06F 17/212; G06F 17/227; G06F 8/38
See application file for complete search history.

(56) References Cited

U.S. PATENT DOCUMENTS

| | | | | |
|---|---|---|---|---|
| 6,281,896 B1 * | 8/2001 | Alimpich | ............ | G06F 3/04842 715/781 |
| 8,261,231 B1 * | 9/2012 | Hirsch | ....................... | G06F 8/20 709/201 |
| 8,341,516 B1 * | 12/2012 | Mason | ................. | G06F 17/2247 715/238 |
| 9,268,562 B1 * | 2/2016 | Mangtani | ................... | G06F 8/71 |
| 2002/0109718 A1 * | 8/2002 | Mansour | .................. | G06F 9/452 715/744 |
| 2002/0129129 A1 * | 9/2002 | Bloch | ........................ | G06F 8/61 709/220 |
| 2003/0067489 A1 * | 4/2003 | Candy Wong | ........... | H04L 67/36 715/765 |
| 2004/0010462 A1 * | 1/2004 | Moon | ..................... | G06Q 20/04 705/39 |
| 2004/0064475 A1 * | 4/2004 | Maeda | ............... | G06F 17/30905 |

(Continued)

*Primary Examiner* — Nicholas Klicos
(74) *Attorney, Agent, or Firm* — Cooper Legal Group, LLC

(57) ABSTRACT

A user interface (UI) layout description language is described in which a UI may be specified for presentation by different versions of the same app running on different platforms. A layout engine written in a platform-specific language parses the UI layout description and transforms it to a native view using native UI components. The app on each platform has its own layout engine, but each can use the same layout description to generate a native view. Thus, a UI can be built once for all of the platforms. And because the UI layout engines are written in the language of their corresponding platforms, the UIs generated are high performing.

25 Claims, 4 Drawing Sheets

(56) References Cited

U.S. PATENT DOCUMENTS

| | | | |
|---|---|---|---|
| 2004/0205583 A1* | 10/2004 | Jones | G06F 17/2229 715/237 |
| 2006/0085779 A1* | 4/2006 | Lin | G06F 17/5054 716/124 |
| 2006/0150178 A1* | 7/2006 | Jerrard-Dunne | G06F 8/71 717/168 |
| 2007/0266176 A1* | 11/2007 | Wu | G06F 17/2247 709/242 |
| 2008/0082603 A1* | 4/2008 | Mansour | H04L 29/06 709/203 |
| 2009/0234823 A1* | 9/2009 | Wong | G06F 16/9577 |
| 2009/0241135 A1* | 9/2009 | Wong | G06F 9/451 719/328 |
| 2009/0249374 A1* | 10/2009 | Hepper | G06F 8/71 719/332 |
| 2010/0030752 A1* | 2/2010 | Goldentouch | G06F 17/30911 707/797 |
| 2011/0066732 A1* | 3/2011 | Iwade | G06F 17/30902 709/227 |
| 2011/0265003 A1* | 10/2011 | Schubert | G06F 3/048 715/716 |
| 2013/0227522 A1* | 8/2013 | Lerum | G06F 9/454 717/120 |
| 2013/0247005 A1* | 9/2013 | Hirsch | G06F 8/71 717/121 |
| 2014/0282398 A1* | 9/2014 | Podolyak | G06F 8/71 717/121 |
| 2014/0282399 A1* | 9/2014 | Gorelik | G06F 8/71 717/122 |
| 2014/0337414 A1* | 11/2014 | Sojoodi | H04W 4/003 709/203 |
| 2015/0277673 A1* | 10/2015 | Ye | G06F 3/04842 715/800 |
| 2016/0070457 A1* | 3/2016 | Furtwangler | G06F 3/04847 715/763 |

* cited by examiner

PROGRAMMATIC NATIVE RENDERING OF STRUCTURED CONTENT

BACKGROUND

Mobile app development has traditionally involved developers building user interfaces in native code, i.e., code that runs directly on the operating system of the mobile device. This is a time-consuming and inflexible process, requiring engineers to implement the same views and logic on multiple platforms, especially if these views are displaying remote data that needs to be rendered consistently across devices.

Recently, tools like Facebook's React Native and Titanium's Appcelerator have been developed which allow developers to write apps for mobile devices in JavaScript. The JavaScript runs on the mobile device and these tools effect the transformation between the JavaScript and the device's native code. This approach has the potential to accelerate app development in that many developers are familiar with coding in JavaScript, and JavaScript is a dynamic language that doesn't require compilation before code can be tested.

Unfortunately, execution of JavaScript on mobile devices is inefficient compared to native code. In addition, JavaScript can be vulnerable from a security perspective, particularly for executable code written by third parties or transmitted from remote platforms.

SUMMARY

According to a particular class of implementations, methods, systems, devices, and computer-program instructions are provided by which a first version of an application is provided to a first device having a first operating system. The first version of the application is in a first platform-specific language of the first device and includes a first layout engine configured to receive a first user interface (UI) layout description specified in a UI layout description language, and to generate a first native view for presentation on the first device using the first UI layout description and one or more native UI components of the first device. A second version of the application is provided to a second device having a second operating system. The second version of the application is in a second platform-specific language of the second device. The second platform-specific language is different than the first platform-specific language of the first device. The second version of the application includes a second layout engine configured to receive the first UI layout description, and to generate a second native view for presentation on the second device using the first UI layout description and one or more native UI components of the second device. The first native view is substantially the same visually as the second native view.

In some implementations, the first UI layout description is provided to a third device having a web browser configured to present a UI using the first UI layout description that is substantially the same visually as the first and second native views.

According to another class of implementations, methods, systems, devices, and computer-program instructions are provided by which a UI layout tree is built using a UI layout description specified in a UI layout description language that is different from the platform-specific language of a device. A UI layout position is determined for each of the elements of the UI layout tree. A native view is generated using the UI layout tree, the UI layout position of each of the elements of the UI layout tree, and the native UI components.

According to some implementations, data is bound to one or more elements of the UI layout tree, and the native view is generated using this data. According to more specific implementations, the native view is cached, and new data is bound to the native view to generate a new native view.

According to some implementations, the UI layout tree is built by parsing the UI layout description to identify a hierarchy of non-native UI components. According to a more specific implementation in which one of the non-native UI components represents multiple instances of an object type. Nodes are added to the UI layout tree for each of the instances of the object type.

According to some implementations, the UI layout position is determined for each of the elements of the UI layout tree by computing at least one coordinate in two dimensions for each of the elements of the UI layout tree.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

According to various implementations, a layout description language is provided in which a user interface (UI) may be specified for presentation by different versions of the same application (app) running on multiple platforms (e.g., mobile devices running iOS or Android, web browsers displaying HTML, etc.). A UI layout engine on each platform is written in a platform-specific language and is integrated or associated with the app. The layout engine parses the description of the UI and transforms it to a native view using native UI components (and possibly data bound to the layout description). The app on each platform has its own platform-specific UI layout engine, but all of them can use the same layout description to generate a native view. Thus, rather than writing code for different versions of the same UI for multiple platforms, a UI can be built once for all of the platforms. And because the UI layout engines are written in the native language of their corresponding platforms, the UIs generated are high performing; particularly in relation to mobile device apps that require transformations between locally executing JavaScript and native code.

Figure 1:
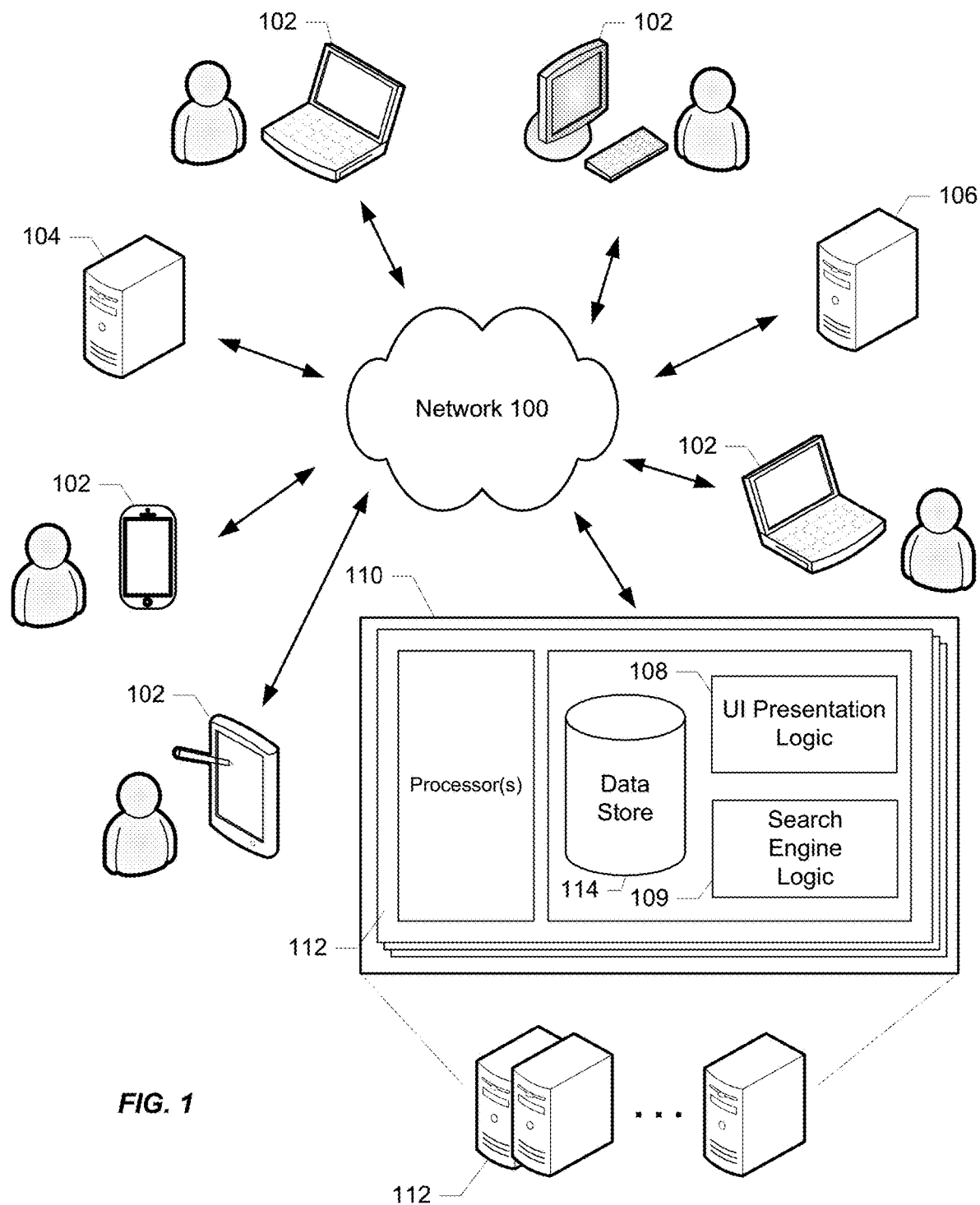
FIG. 1 is a simplified diagram of a computing environment in which various implementations may be practiced.

FIG. 1 shows a network environment in which techniques enabled by this disclosure may be implemented. The depicted network 100 may include any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 102 may be any device capable of connecting to network 100, interacting with the great diversity of sites, networks, and systems interconnected by or integrated with network 100, and downloading and executing applications and apps in ways that result in the presentation of user interfaces on client devices 102. Such devices include, but are not limited to, mobile devices (e.g., cell phones, smart phones, smart watches, tablets, etc.), personal computers (e.g., laptops and desktops), set top boxes (e.g., for cable and satellite systems), smart televisions, and gaming systems.

User interfaces may be presented on client devices 102 according to the techniques described herein in a variety of ways. For example, a UI layout may be stored in the layout description language on the client device for presentation when called during execution of the corresponding app. Alternatively, a UI layout may be transmitted in the layout description language to the client device for presentation in response to a call from the app to a remote platform. And once a native view of a particular UI layout has been created, it may be saved locally on the client device for presentation with the same or different data bound to the view.

The UI layout and/or the data bound to the UI layout for a given app may originate from a variety of sources. For example, both the UI layout and any bound data may be resident in memory on the client device as part of or in association with the app. Alternatively, the UI layout may be resident on the client device while any bound data may be transmitted from a remote platform (e.g., server 104) for presentation in conjunction with the UI layout in response to calls from the app or the layout engine. As another alternative, both the UI layout and any bound data may be transmitted to the client device from one or more remote platforms. That is, the UI layout and the data might come from the same remote platform (e.g., server 104), or be obtained from separate, potentially independent platforms (e.g., servers 104 and 106). And different UIs presented within one app (as well as their respective bound data) might come from different remote sources. Therefore, in view of the diversity of ways in which a client device can acquire UI layouts and any data bound to those layouts, the scope of this disclosure should not be limited by reference to the specific examples described herein.

For the sake of clarity and simplicity, FIG. 1 and the following description assume an implementation in which the presentation of user interfaces as enabled by this disclosure (represented by UI presentation logic 108) is implemented as part of a search service platform 110 that retrieves and provides search results to client devices 102 for presentation (represented by search engine logic 109). As will be understood, platform 110 may conform to any of a wide variety of architectures such as, for example, a distributed platform deployed at one or more co-locations, each implemented with one or more servers 112. Data store 114 is also shown as part of platform 110 and may include, among other things, search results, UI layouts, and data for binding to the UI layouts. However, it should be noted that implementations are contemplated in which one or more of these functions or data sets operate or are stored remotely from the others (e.g., on other platforms such as servers 104 or 106), and/or are under the control of one or more independent entities (e.g., content providers, publishers, advertisers, etc.). And it should be noted that presenting UIs in conjunction with a search service is merely one example of the many types of services and/or content that may be provided in UIs as described herein. More generally, the presentation of UIs as enabled by the present disclosure may be used in connection with providing any type of online service, and/or to present any kind of content on any kind of computing device.

It should also be noted that, despite references to particular computing paradigms and software tools herein, the logic and/or computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, any references to particular protocols herein are merely by way of example. Suitable alternatives known to those of skill in the art for all of these variations may be employed.

Figure 2:
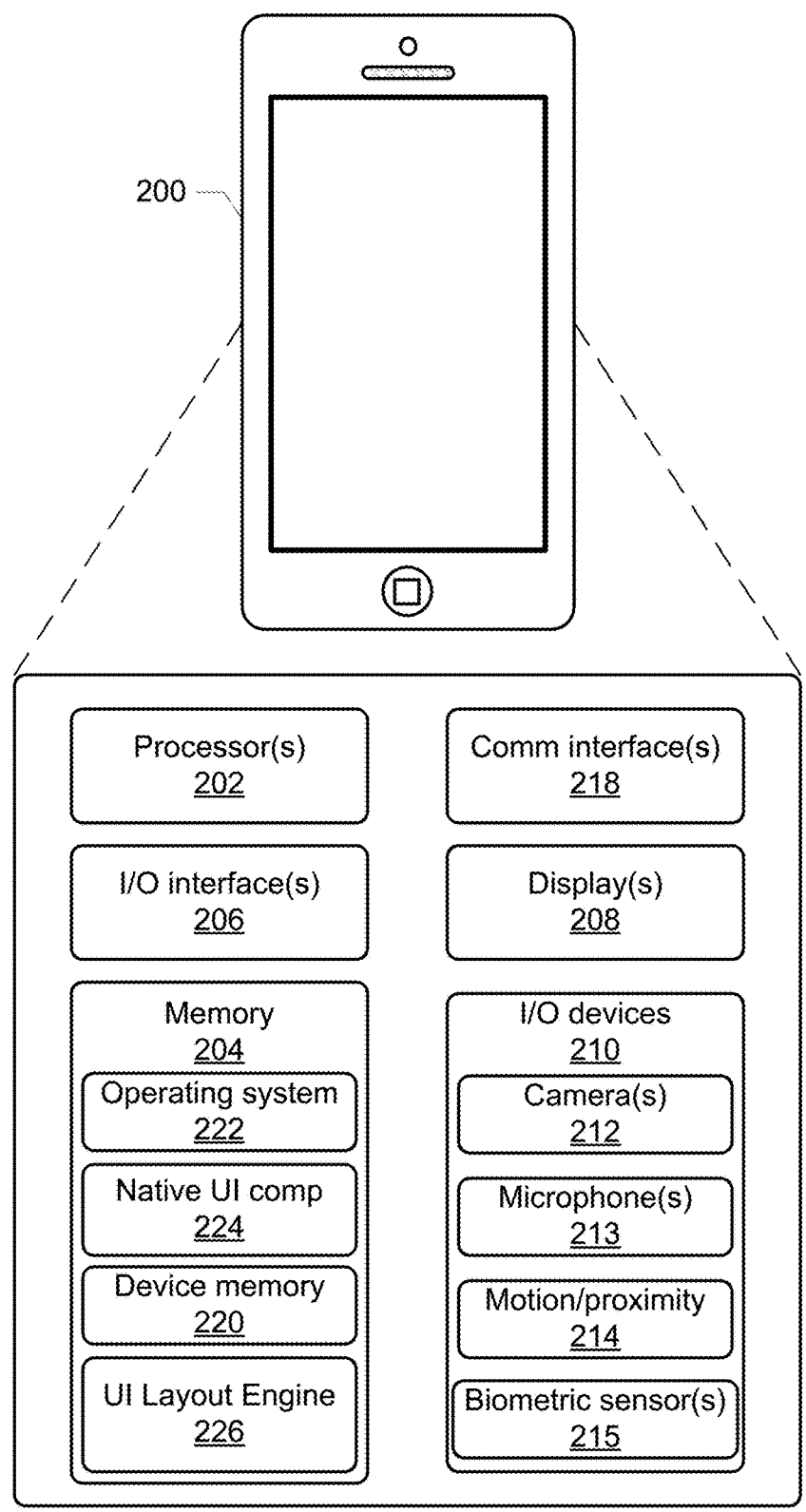
FIG. 2 is a simplified diagram of a client device for use with various implementations.

FIG. 2 illustrates an example of client device (in this case a smart phone) that may be used with various implementations enabled by the present disclosure. Client device 200 includes (or has associated therewith) one or more processors 202 configured to execute stored instructions (e.g., in memory 204). Client device 200 may also include (or have associated therewith) one or more I/O interface(s) 206 to allow communication with one or more displays 208 and one or more I/O devices 210. I/O interface(s) 206 may include, for example, an inter-integrated circuit (I2C) interface, a serial peripheral interface (SPI) bus, a universal serial bus (USB), an RS-232 interface, a media device interface, etc. I/O device(s) 210 may include, for example, one or more cameras 212, one or more microphones 213, one or more motion/proximity sensors 214, one or more biometric sensors 215 (e.g., fingerprint or retinal scanning, facial recognition, etc.). The one or more displays 208 are configured to present UIs as described herein and may comprise any of a variety of suitable display technology.

Client device 200 may also include one or more communication interfaces 218 configured to provide communications between client device 200 and other devices (e.g., remote servers). Such communication interface(s) 218 may be used to connect to cellular networks, personal area networks (PANs), local area networks (LANs), wide area networks (WANs), and so forth. For example, communications interfaces 218 may include RF modules for a 3G or 4G cellular network, a WiFi LAN, and/or a Bluetooth PAN. Client device 200 also includes one or more buses or other internal communications hardware or software (not shown) that allow for the transfer of data and instructions between the various modules and components of the system.

Memory 204 of client device 200 includes device memory 220 which includes non-transitory computer-readable storage media that may be any of a wide variety of types of volatile and non-volatile storage media including, for example, electronic storage media, magnetic storage media, optical storage media, quantum storage media, mechanical storage media, and so forth. Device memory 220 provides storage for computer readable instructions, data structures, program modules and other data for the operation of client device 200, as well as applications or apps for which UIs may be presented as described herein. It should be noted that the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Device memory 220 also includes at least one operating system (OS) module 222 written in the native code of device 220 and configured to manage hardware resources such as I/O interfaces 206 and provide various services to applications, apps, or modules executing on processor(s) 202. Examples of such operating system modules include, but are not limited to, iOS and Android. Device memory 220 also includes a native UI components 224 for the construction of interactive UIs. As will be appreciated, device memory 220 may include a variety of other modules that are not depicted for the sake of clarity. Device memory 220 also includes logic written in native code (UI layout engine 226) responsible for parsing UI layout descriptions and transforming them to native views using native UI components 224 and any data bound to the layout descriptions. As will be appreciated, for implementations for Web browsers, this logic may be written in JavaScript. Device memory 220 may also store (at least temporarily) UI layout descriptions and the corresponding data in connection with presentation of UIs as described herein.

Figure 3:
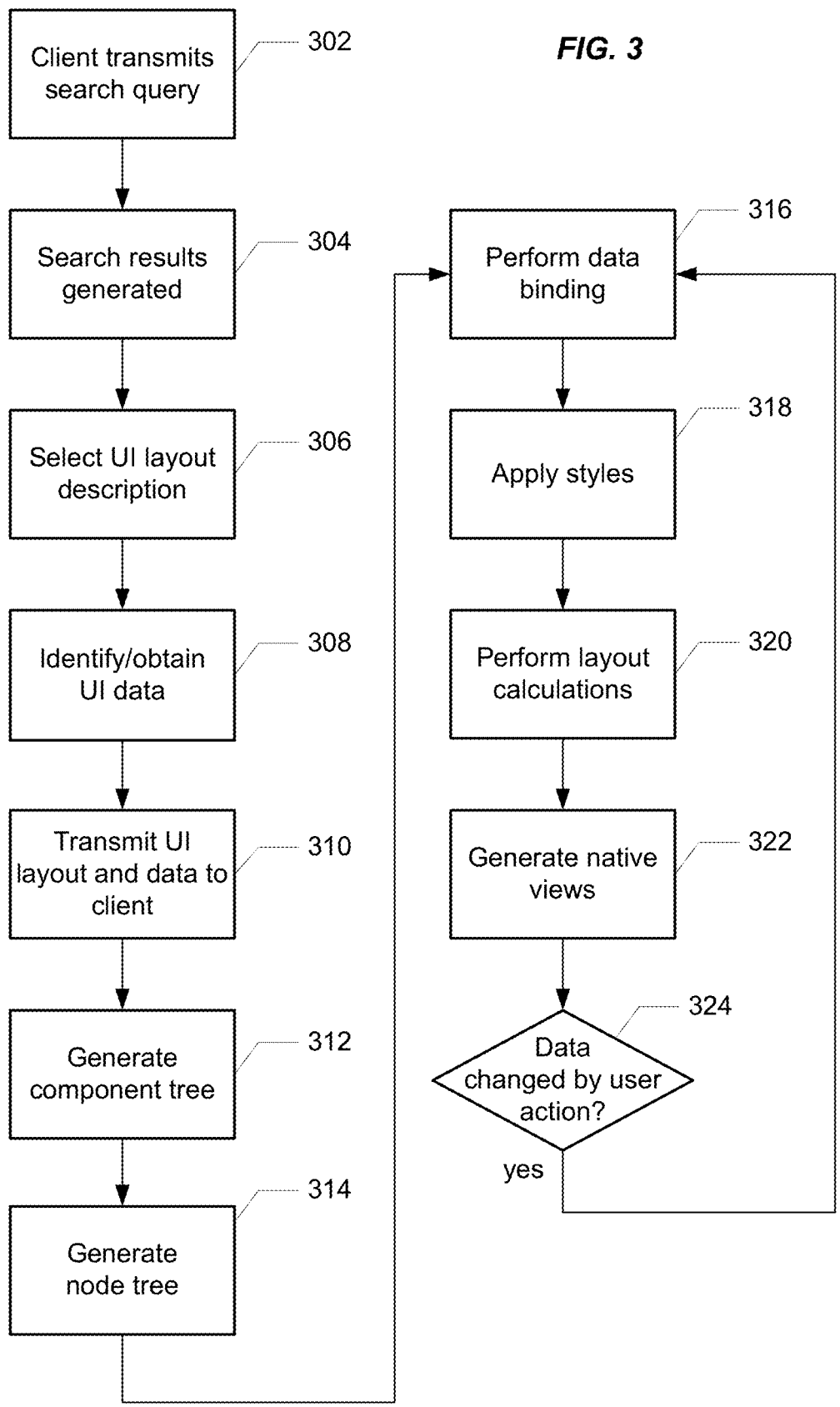
FIG. 3 is a flow diagram illustrating presentation of user interfaces according to a specific implementation.

An example of the presentation of user interfaces according to a particular implementation will now be described with reference to the flowchart of FIG. 3. In the depicted example, the UIs are search result UIs presented in connection with use of a search app on a client device. Each search result UI includes information relating to a particular entity (e.g., document, video, person, company, product, etc.) that is responsive to an information need (e.g., a search query) that is explicitly or implicitly specified by a user of the app on the client device. Using a UI layout description language enabled by the present disclosure, a search result UI may be constructed from a generic layout description to have the same "look and feel" across multiple platforms (e.g., Android, iOS, and the Web). And because the native views on each platform are constructed from the layout description by a layout engine implemented in a platform-specific language (e.g., native code), the resulting interactive UIs are high performing.

A request, e.g., a search query, is transmitted from the client device, e.g., client device 200, to a remote platform (302), e.g., search service platform 110, in response to which a set of search results is generated and ranked (304) according to any of a variety of techniques. For each of the search results, a UI layout description is selected (306), and any data representing the content associated with the layout (or references to the content) is identified or obtained (308). The UI layout descriptions and any corresponding data obtained for each of the search results is then transmitted to the client device for presentation (310). It is again worth noting that search is merely an example of the myriad ways in which the techniques described herein may be used.

Figure 4:
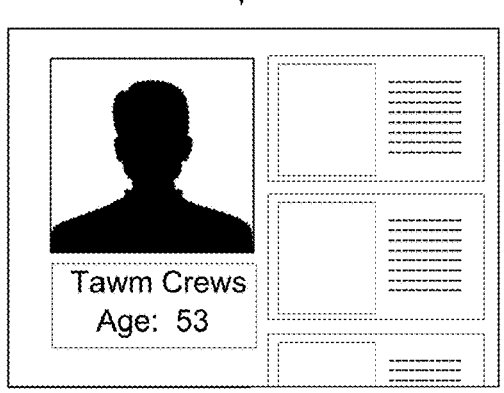
FIG. 4 is a simplified example of creation of a UI component tree according to a particular implementation.

According to a specific class of implementations, each UI layout description is encoded in a UI layout description language. This language expresses the relationship between visual elements on screen and can be transmitted using any data serialization format, for example JavaScript Object Notation (JSON) or Extensible Markup Language (XML). Each client device has a UI layout engine (e.g., UI layout engine 226) implemented in a platform-specific language, e.g., native code, that takes the layout description and transforms it to a native view using the native UI components associated with its operating system. Each client device has its own UI layout engine but, regardless of the language in which each is implemented, all of them can use the same layout description to generate native views that look the same across the different devices. An example of simplified representation of a JSON-based UI layout description 402 is shown in FIG. 4. As will be discussed, layout description 402 is parsed by the UI layout engine on the client device to build a component tree 404 which is used to render a native view 406.

Using its UI layout engine, the client device parses each layout description to generate a component tree (312), i.e., a hierarchy of non-native, abstract representations of the components of the corresponding UI. The UI components specified may include a wide range of UI components such as, for example, box, text, image, map, buttons, input fields, etc. Some implementations support components with no visual representation. One example is a component representing an if-else conditional, i.e., if the condition is true, one set of views is shown, otherwise another. Another example is a list component that iterates and repeats its child components multiple times. As will be appreciated, any type of user interface component may be represented.

The computation of logical or hidden elements of the component tree represents an optional additional step in the rendering process as they determine whether a part of the component tree needs to be displayed. In such cases, these elements are computed to a node tree that includes all of the components that get displayed (314). Each node of the node tree is an object that can have associated layout positioning information and one or more data sources. One way to think about it is that the component tree maps to the abstract UI layout description while the node tree maps to the native UI components to be displayed. In addition, there may be nodes that don't end up with native views created for them. If a node is completely hidden (display: none), it will be deleted from the node tree. If a node is present for layout but not visible to the user (visibility: hidden), it will be part of subsequent processing but no native view will be created. If a node is visible, but has no visual impact on the layout other than spacing, it may be removed from the rendering process automatically.

In some implementations, layouts and data are received separately and then combined before the final views are displayed to the user. In these implementations, an optional data binding step occurs in the rendering process (316). This data represents the content required to fully render the native UI components, e.g., a .jpg file for an image component, a text file for a text component, and so on. The data may be the actual content itself or references (e.g., links) to the content which may be stored locally, stored on the remote platform from which the UI layout description was received, or stored on a different remote platform. This data binding approach allows for the creation of UI templates that can be used for different content data (e.g., celebrity bios), and even different data sources (e.g., real estate listings or restaurant reviews from different services). In addition, data can be updated in real time and re-bound to the layout, allowing live updates for dynamic content like sports scores or stock quotes. Data can be provided from the server in a serialized format or locally on the device such as, for example, contacts on a phone or the current time. It should be noted, however, that implementations are contemplated in which this separate data binding is not required for the rendering and display of user interfaces as enabled by this disclosure.

Once the complete node tree is generated and data binding is performed, styles (i.e., UI attributes specified by a designer such as font type and size) are applied (318). According to some implementations, style attributes may be added directly to the components themselves, and/or sent through a stylesheet. The latter approach emulates CSS stylesheets, with two optional enhancements. First, because of the different density displays across the various mobile devices, scalar measurements may be expressed with density-independent units. Second, for performance reasons, there is no cascading or inheritance for style rules. A simple text-match is used to determine what styles apply to a given node. If the node mentions one style, that is the only styling that will be applied to the node no matter where it appears in the hierarchy. A simple override system applies where attributes set directly on the node override those from the stylesheet.

Once styles have been applied to the nodes of the node tree, layout calculations are performed that determine one or more x-y coordinates for each of the objects in the tree (320), e.g., the corner of a box having a particular size. A particular class of implementations makes use of the open-source css-layout library developed by Facebook for layout calculation, available for Java, C, and JavaScript. This library provides a cross-platform tool that can provide layout information for a tree of nodes. This library implements a subset of the CSS flexible box (flexbox) layout model described in CSS Flexible Box Layout Module Level 1, W3C Last Call Working Draft 14 May 2015, the entirety of which is incorporated herein by reference for all purposes. Within this model, child elements are sized and positioned based on rules set on the parent, like the direction to lay the elements out and how to distribute the space evenly. To handle the overlapping of two views, the css-layout library also provides support for fixing the position of an element.

Once the x-y positions of the UI objects represented in the node tree are known, a native view of the visible nodes is generated (322). The UI layout engine traverses the node tree recursively and, using the styles, layout calculations, and data bound to the objects in the tree, renders the native view using the native UI components of the client device. And because the UI layout engine is implemented in a platform-specific language, this process is highly efficient.

According to some implementations, much of the rendering process (excepting creation of the native views) can be done on a background thread. This allows apps to stay responsive even during rendering. In addition, the process may be designed so that each stage only has to do a single pass on the corresponding tree. This ensures that regardless of tree complexity, rendering is linear with the number of components or nodes in the tree. In addition, some implementations support extensive view recycling. Whenever a certain layout is used, views corresponding to such layouts can be reclaimed from a pool of recently used views. When a new layout comes into view, the UI engine can check if that layout was recently on screen and reuse the native views. This reduces the need for creating new views, especially when users are scrolling through similar-looking content, improving scrolling performance. According to a particular implementation, rendering is partitioned into rows of content referred to as modules. These modules are discrete sections of content that can be rendered independently of each other. As a user scrolls through the content, each module is rendered when it comes on the screen. This breaks up the work of rendering into incremental chunks and improves scrolling performance.

When the user takes an action (e.g., button click, screen tap, swipe, etc.) that causes data bound to the UI to change (324), the new data is bound (316), styles calculated (318), layouts calculated (320), and if needed, views generated (322). According to various implementations, different types of interactivity may be supported. For example, some types of interactive components do not need to keep internal state such as, for example, links to other apps or web sites, media players, interactive maps, and scrollable lists. These are readily supported as native views configured and rendered from components. For tap actions, a URL listening scheme may be provided. The app can also register itself to handle certain URL patterns (e.g. action://app/open_email). Rendered elements can have a "url" field associated with them. When tapped, the appropriate handler is found and triggered for the given action. Some interactions alter other views on the page. For example, interaction with a "like" button might increment a counter on the page, or interaction with a "Load More" button might update the screen with additional data. To handle these cases, native code may be invoked to be on certain types of events, e.g., taps, with the native code dispatching updates to the data, triggering a re-layout of the UI.

As will be appreciated, implementations enabled by this disclosure have the potential for removing the UI design part of app development from something engineers have to do (by writing code) to something designers (who don't have to be programmers) can do by specifying things at a higher level of abstraction. This is in contrast with conventional app development in which app designers have to work iteratively with engineers on even minor UI details to get the views to look as desired. And because the techniques described herein support rendering of UIs on the web, this enables browser-based UI construction tools. That is, designers can use an interactive integrated development environment (IDE) to design interfaces and publish them for availability on mobile devices. This significantly improves the app development process, as designers can create or update UIs independent of any engineering effort. And once published (e.g., to a central layout repository), the UI descriptions can be readily accessed by app developers and integrated with new or existing apps. Integration may even be managed automatically upon publication.

It will be understood by those skilled in the art that changes in the form and details of the implementations described herein may be made without departing from the scope of this disclosure. For example and as mentioned above, the presentation of UIs as described herein may be done in support of a wide range of applications and services. As will be appreciated, examples are too numerous to mention, encompassing any app or application for which it would be advantageous to provide generic UI representations for use with multiple platforms.

Finally, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:
1. A computing device, comprising:
memory including an operating system implemented in a platform-specific language, native user interface (UI)

components, and an application implemented in the platform-specific language, the application including a UI layout engine;

a display; and one or more processors operatively coupled to the memory and the display, the one or more processors being configured to use the UI layout engine to:

build a UI layout tree using a UI layout description received from a remote platform responsive to a call by the application or the UI layout engine to the remote platform, the UI layout description specified in a UI layout description language that is different from the platform-specific language and corresponding to at least one of a particular content type or a data source;

bind data received by the computing device from one or more remote platforms to one or more elements of the UI layout tree, the data including or representing content;

determine a UI layout position for each of the one or more elements of the UI layout tree;

generate a native view using the UI layout tree, the data bound to the one or more elements of the UI layout tree, the UI layout position of each of the one or more elements of the UI layout tree, and the native UI components;

the one or more processors being configured to present the content using a UI corresponding to the native view on the display;

store the native view in a pool of recently used views;

responsive to determining a new layout, determine whether one or more views corresponding to the new layout are in the pool of recently used views; and responsive to determining that the native view in the pool of recently used views corresponds to the new layout, use the native view to present content of the new layout.

2. The computing device of claim 1, wherein the presenting the content of the new layout comprises:

partitioning at least one content into one or more rows of content, wherein each row of content comprises a discrete section of content renderable independently from one or more other discrete sections of content; and responsive to a user scrolling through at least some content, rendering each module when the corresponding module comes on screen in association with the scrolling.

3. The computing device of claim 1, wherein the one or more processors are configured to bind new data received from the remote platform or a second remote platform to the native view to generate a new native view.

4. The computing device of claim 1, wherein the one or more processors are configured to obtain at least a portion of the data from a second remote platform.

5. The computing device of claim 1, wherein the one or more processors are configured to use the UI layout engine to determine whether to display one or more components of the UI layout tree by:

associating elements of the UI layout tree with a node tree;

responsive to determining that a first node of the node tree is hidden, deleting the first node from the node tree;

responsive to determining that a second node of the node tree is present for layout but not visible, including the second node in one or more subsequent processing acts but not creating one or more native views associated with the second node; and responsive to determining that a third node of the node tree is visible but has no visual impact on at least one layout other than spacing, removing the third node from a rendering process.

6. The computing device of claim 1, wherein the one or more processors are configured to build the UI layout tree by parsing the UI layout description to identify a hierarchy of non-native UI components.

7. The computing device of claim 1, wherein the one or more processors are configured to use the UI layout engine to determine whether to display one or more components of the UI layout tree by:

associating elements of the UI layout tree with a node tree; and responsive to determining that a first node of the node tree is hidden, deleting the first node from the node tree.

8. The computing device of claim 1, wherein the one or more processors are configured to use the UI layout engine to determine whether to display one or more components of the UI layout tree by:

associating elements of the UI layout tree with a node tree; and responsive to determining that a first node of the node tree is present for layout but not visible, including the first node in one or more subsequent processing acts but not creating one or more native views associated with the first node.

9. The computing device of claim 1, wherein the one or more processors are configured to use the UI layout engine to determine whether to display one or more components of the UI layout tree by:

associating elements of the UI layout tree with a node tree; and responsive to determining that a first node of the node tree is visible but has no visual impact on at least one layout other than spacing, removing the first node from a rendering process.

10. A computer program product comprising one or more non-transitory computer-readable media having computer program instructions stored therein, the computer program instructions being in a platform-specific language of an operating system and being configured such that, when executed by one or more processors, the computer program instructions cause the one or more processors to:

build a user interface (UI) layout tree using a UI layout description received from a remote platform responsive to a search query transmitted to the remote platform, the UI layout description specified in a UI layout description language that is different from the platform-specific language and corresponding to at least one of a particular content type or a data source;

process data received from one or more remote platforms responsive to the search query, the data including or representing one or more search results;

bind the data to one or more elements of the UI layout tree;

determine a UI layout position for each of the one or more elements of the UI layout tree;

generate a native view of a UI using the UI layout tree, the data bound to the one or more elements of the UI layout tree, the UI layout position of each of the one or more elements of the UI layout tree, and native UI components associated with the operating system;

present the one or more search results using the UI corresponding to the native view on a display;

store the native view in a pool of recently used views;

responsive to determining a new layout, determine whether one or more views corresponding to the new layout are in the pool of recently used views; and responsive to determining that the native view in the pool of recently used views corresponds to the new layout, use the native view to present one or more second search results of the new layout.

11. The computer program product of claim 10, wherein the computer program instructions are configured to cause the one or more processors to retrieve the UI layout description from local memory associated with the operating system.

12. The computer program product of claim 10, wherein the computer program instructions are configured to cause the one or more processors to bind new data received from the remote platform or a second remote platform to the native view to generate a new native view.

13. The computer program product of claim 10, wherein the computer program instructions are configured to cause the one or more processors to obtain the data from a second remote platform.

14. The computer program product of claim 10, wherein the UI layout description language employs the JavaScript Object Notation (JSON) format.

15. The computer program product of claim 10, wherein the computer program instructions are configured to cause the one or more processors to build the UI layout tree by parsing the UI layout description to identify a hierarchy of non-native UI components.

16. The computer program product of claim 15, wherein one of the non-native UI components represents multiple instances of an object type, and wherein the computer program instructions are configured to cause the one or more processors to add nodes to the UI layout tree for each of the instances of the object type.

17. The computer program product of claim 10, wherein the computer program instructions are configured to cause the one or more processors to determine the UI layout position for each of the one or more elements of the UI layout tree by computing a coordinate in two dimensions for each of the one or more elements of the UI layout tree.

18. The computer program product of claim 17, wherein the computer program instructions are configured to cause the one or more processors to compute the coordinate in two dimensions for each of the one or more elements of the UI layout tree using a subset of the CSS Flexible Box Layout Model.

19. A computer-implemented method, comprising:
transmitting a search query to a remote platform;
receiving a user interface (UI) layout description from the remote platform responsive to the search query, the UI layout description specified in a UI layout description language that is different from a platform-specific language and corresponding to at least one of a particular content type or a data source;
building a UI layout tree using the UI layout description;
process data received from one or more remote platforms responsive to the search query, the data including or representing one or more search results;
binding the data to one or more elements of the UI layout tree;
determining a UI layout position for each of the one or more elements of the UI layout tree;
generating a native view of a UI using the UI layout tree, the data bound to the one or more elements of the UI layout tree, the UI layout position of each of the one or more elements of the UI layout tree, and native UI components associated with an operating system;
presenting the one or more search results using the UI corresponding to the native view on a display;
storing the native view in a pool of recently used views;
responsive to determining a new layout, determining that one or more views corresponding to the new layout are in the pool of recently used views; and
responsive to determining that the native view in the pool of recently used views corresponds to the new layout, using the native view to present one or more second search results of the new layout.

20. The method of claim 19, comprising:
obtaining at least a portion of the data from the remote platform.

21. The method of claim 19, comprising:
obtaining at least a portion of the data from a second remote platform.

22. The method of claim 19, wherein the UI layout description language employs the JavaScript Object Notation (JSON) format.

23. The method of claim 19, comprising:
building the UI layout tree by parsing the UI layout description to identify a hierarchy of non-native UI components.

24. The method of claim 23, wherein one of the non-native UI components represents multiple instances of an object type, the method comprising:
adding nodes to the UI layout tree for each of the instances of the object type.

25. The method of claim 19, comprising:
determining the UI layout position for each of the one or more elements of the UI layout tree by computing a coordinate in two dimensions for each of the one or more elements of the UI layout tree.

* * * * *